US010366235B2

(12) United States Patent
Kurjanowicz et al.

(10) Patent No.: US 10,366,235 B2
(45) Date of Patent: Jul. 30, 2019

(54) SAFE MOUNTING OF EXTERNAL MEDIA

(71) Applicant: Microsoft Technology Licensing, LLC, Redmond, WA (US)

(72) Inventors: Matthew David Kurjanowicz, North Bend, WA (US); Adam Warren Burch, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/382,272

(22) Filed: Dec. 16, 2016

(65) Prior Publication Data
US 2018/0173878 A1 Jun. 21, 2018

(51) Int. Cl.
*G06F 21/51* (2013.01)
*G06F 21/56* (2013.01)
*G06F 16/188* (2019.01)
*G06F 9/455* (2018.01)
*G06F 21/53* (2013.01)

(52) U.S. Cl.
CPC ........ *G06F 21/566* (2013.01); *G06F 9/45558* (2013.01); *G06F 16/196* (2019.01); *G06F 21/53* (2013.01); *G06F 21/567* (2013.01); *G06F 21/51* (2013.01); *G06F 2009/45579* (2013.01); *G06F 2009/45583* (2013.01); *G06F 2009/45595* (2013.01); *G06F 2221/034* (2013.01)

(58) Field of Classification Search
CPC .................................................... G06F 21/566
See application file for complete search history.

(56) References Cited

U.S. PATENT DOCUMENTS

| 7,681,238 | B2 | 3/2010 | Plastina et al. |
| 8,103,809 | B1 * | 1/2012 | Michels ................ G06F 15/167 710/22 |
| 8,261,320 | B1 | 9/2012 | Serenyi et al. |
| 8,332,846 | B2 * | 12/2012 | Astrand ............. G06F 9/45537 710/72 |
| 8,700,820 | B2 | 4/2014 | Chen |
| 8,869,145 | B1 | 10/2014 | Barve et al. |
| 8,924,571 | B2 | 12/2014 | Pratt et al. |

(Continued)

FOREIGN PATENT DOCUMENTS

CN 104317759 A 1/2015
CN 106168903 A 11/2016

(Continued)

OTHER PUBLICATIONS

"Using USB Devices on Virtual Machines", https://access.redhat.com/documentation/en-US/Red_Hat_Enterprise_Virtualization/3.0/html/User_Portal_Guide/Using_Desktop-Using_USB_on_VM.html, Retrieved on: Oct. 27, 2016, 2 pages.

(Continued)

*Primary Examiner* — Kambiz Zand
*Assistant Examiner* — Thanh H Le
(74) *Attorney, Agent, or Firm* — Liang IP, PLLC

(57) ABSTRACT

Mounting a filesystem for media. The method includes detecting that media has been connected to a computing device. The method further includes causing a filesystem for the media to be mounted to a virtual machine. The virtual machine is coupled to a server. The method further includes causing file data from the media organized by the filesystem to be served from the server to the computing device.

20 Claims, 4 Drawing Sheets

(56) References Cited

U.S. PATENT DOCUMENTS

| | | |
|---|---|---|
| 9,081,960 B2 | 7/2015 | Shue et al. |
| 9,148,428 B1 | 9/2015 | Banga et al. |
| 9,195,473 B2 | 11/2015 | Tyhurst et al. |
| 2011/0047618 A1* | 2/2011 | Evans .................. G06F 21/566 726/23 |
| 2011/0145886 A1* | 6/2011 | McKenzie .............. G06F 21/83 726/1 |
| 2015/0095597 A1 | 4/2015 | Ayanam et al. |
| 2016/0048438 A1 | 2/2016 | Martos et al. |
| 2016/0364257 A1 | 12/2016 | Graf et al. |

FOREIGN PATENT DOCUMENTS

| | | |
|---|---|---|
| KR | 20110034350 A | 4/2011 |
| WO | 2013008058 A1 | 1/2013 |

OTHER PUBLICATIONS

"QEMU", http://web.archive.org/web/20150423105509/https:/wiki.archlinux.org/index.php/QEMU, Published on: Apr. 23, 2015, pp. 1-33.

"EMC VNX Series: Introduction to SMB 3.0 Support", In White Paper, Mar. 2016, pp. 1-23.

"International Search Report and Written Opinion Issued in PCT Application No. PCT/US17/065660", dated Mar. 26, 2018, 10 Pages.

\* cited by examiner

SAFE MOUNTING OF EXTERNAL MEDIA

BACKGROUND

Background and Relevant Art

Computers and computing systems have affected nearly every aspect of modern living. Computers are generally involved in work, recreation, healthcare, transportation, entertainment, household management, etc.

Many computing systems include provisions for connecting removable media to the computing systems. For example, such computing systems may allow removable media devices such as USB flash drives, memory cards (such as SD memory cards) etc. to be connected to the computing system. This allows for a simple and convenient way for data to be moved from location to location and device to device by using a small, compact, and lightweight means. However, nefarious actors may be able to use removable media to compromise computing systems to which the removable media is connected. While many users understand the risks associated with executing compromised files on a removable media device, most users are not aware that the actual file system on the removable device, exclusive of the files in the filesystem, may be compromised in such a way so as to create risk for the computing system to which the removable media device is connected. For example, the files system may (intentionally or unintentionally) cause the computing system to crash by accessing restricted or critical resources. Alternatively, or additionally, the file system may be configured to scrape files existing at the computing system to steal user data.

The file system typically runs in kernel mode, with nearly unrestricted access to computing resources. Thus, it can be difficult to protect the computing system from such attacks.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computer implemented method of mounting a filesystem for media. The method includes detecting that media has been connected to a computing system. The method further includes causing a filesystem for the media to be mounted to a virtual machine. The virtual machine is coupled to a server. The method further includes causing file data from the media organized by the filesystem to be served from the server to the computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments illustrated herein implement a lightweight virtual machine on a computing device. When removable media is detected at the computing device, the file system of the removable media is mounted to the lightweight virtual machine. The lightweight virtual machine is connected to a server on the computing device. The server can then serve any files on the removable media back to the computing device. Thus, for example, a computing device will essentially remote into a virtual machine running on the computing device itself. If the file system on the removable media is compromised in such a way that it attacks a system that it is connected to, it will only be able to attack the virtual machine, and not the host computing device. For example, the file system on the removable media will only be able to crash the virtual machine or to scrape files from the virtual machine (of which it is likely that none are files important to, or even related to, the user of the computing device).

Figure 1:
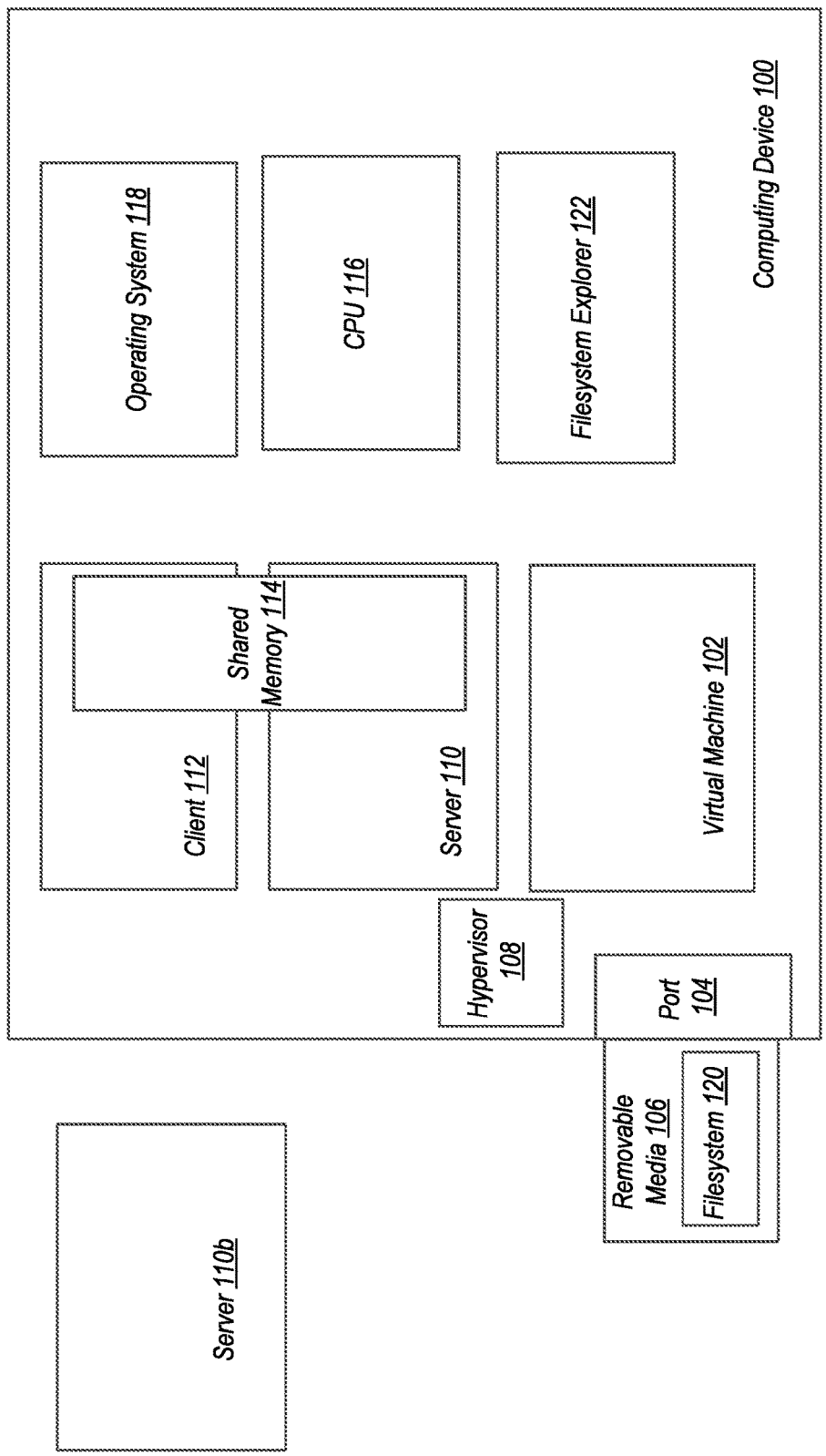
FIG. 1 illustrates a system configured to mount a filesystem on removable media to a virtual machine.

Referring now to FIG. 1, an example is illustrated. FIG. 1 illustrates a computing device 100. The computing device 100 runs a virtual machine 102 on the computing device 100.

The computing device 100 includes a port 104. The port 104 may be for example, a USB port, a Secure Digital (SD) port, an eSATA port, or other appropriate port for connecting removable media 106 to the computing device 100.

The computing device 100, as noted above, may include a virtual machine 102. A virtual machine is an emulated computer system that can provide functionality of a physical computer system by using resources on a host system, such as the computing device 100. The virtual machine 102 is allocated resources from a host system, which in the illustrated example is the computing device 100. Such resources may include processor cycles, system memory, systems storage, access to a network stack, access to connected peripheral devices, etc.

The allocation of resources from the host system, i.e., the computing device 100, is controlled by a hypervisor 108. The virtual machine 102 can only access resources allocated to the virtual machine 102 by the hypervisor 108. Thus, the virtual machine 102 is essentially "sandboxed" from other resources on the computing device 100. Thus, the virtual machine 102 is unable to access other resources to which the hypervisor 108 has not granted access. This can be used to prevent a compromised filesystem 120 of the removable media 106 implemented at the virtual machine 102 from affecting other parts of the computing device 100. A filesystem, as used herein, is an architecture used to control how data is stored and retrieved on storage media. The filesystem may further include, the file data stored on media using the architecture.

Note that the virtual machine 102 may continuously run on the computing device 100 as a sandboxed system to be readily available when removable media is connected to the computing device 100. Alternatively, as will be illustrated in more detail below, in some embodiments the virtual machine 102 will be instantiated when removable media is connected to the computing device 100.

Note that the hypervisor 108 is typically configured to implement a lightweight virtual machine 102 with a minimal set of features. In particular, it is desirable that the virtual machine 102 use as few resources as possible. Thus, in some embodiments, the virtual machine 102 will exclude much of the functionality that might be present in other virtual machines and instead include only basic file system mounting and access functionality, as well as any needed communication functionality.

Thus for example, some embodiments will prevent applications from being launched in the virtual machine 102. In addition to implementing a lightweight virtual machine, this can also protect the virtual machine 102 from being used to launch malicious software applications stored on the removable media 106.

In an alternative or additional example, the virtual machine 102 may have a limited set of communication protocols implemented at the virtual machine 102. That is, certain protocols may be specifically excluded from the virtual machine 102. Additionally, various ports and communication channels may be excluded from the virtual machine 102 if these ports and communication channels are not needed for communicating file data. This can help to implement a lightweight virtual machine as well as prevent external attempts to compromise the virtual machine 102.

In the illustrated example, the hypervisor 108 may be configured to mount the removable media 106 through the port 104 as a file system for the virtual machine 102.

The virtual machine 102 is coupled to a server 110 running at the computing device 100. The server 110 may be a file server. The virtual machine 102 may make file data in its filesystem 120 available to the server 110 allowing the server 110 to serve the files from the filesystem 120 of the removable media 106 to clients of the server 110.

For example, the server 110 may be similar to a network file access server such as shared folders servers available in Windows Server from Microsoft Corporation of Redmond, Wash. These servers use the Server Message Block (SMB) protocol to share files, printers, serial ports, and communicate information between different systems using named pipes and/or mail slots. Thus, the server 110 would appear to clients connecting to the server 110 as a fileshare which shares the files in the filesystem 120 of the removable media 106. However, the clients that connect to the server 110 would connect from the computing device 100 itself rather than externally using a network with external connection. For example, as illustrated in FIG. 1, a client 112 at the computing device 100 would connect to the server 110 for file access. Notably, the client 112 could additionally access servers external to the computing device 100 (such as server 110b) using network connections for accessing networked fileshares, but is also able to access the server 110 on the computing device 100 itself to access fileshares based on data in the filesystem 120 of the removable media 106. Thus, the client 112 may be multi-purpose in that it can be used to access the local server 110 as well as other servers external to the computing device 100.

The client 112, the server 110, and the virtual machine 102 may be configured to communicate in a number of different fashions. For example, in some embodiments, the client 112 and the server 110 and the virtual machine 102 and the server 110 can communicate using application layer network protocols. Such protocols may include one or more of TCP, NetBios API, UDP, or other protocols. In this way, data, and in particular file data from the filesystem 120 of the removable media 106 may be communicated through the virtual machine 102 to the server 110 and to the client 112.

Alternatively, or additionally, some embodiments may use inter-process communication controlled by the operating system 118 of the computing device 100. In particular, inter-process communication allows data to be shared between different processes operating on a computing device such as the computing device 100. Thus for example, in the example illustrated in FIG. 1, the computing device 100 may have shared memory 114 that can be shared between different processes on the computing device 100. In particular, as shown in FIG. 1, the server 110 and the client 112 can share the shared memory 114. Thus, in this example, the server 110 can obtain file data from the virtual machine 102 and the removable media 106. This file data from the virtual machine 102 can then be stored in the shared memory 114. The server 110 can provide, to the client 112, a pointer. The pointer identifies where the file data is stored in the shared memory 114. In this way, the server 110 does not need to send the actual file data to the client 112. Rather, the server 110 can simply send a pointer to the data in the shared memory 114 to the client 112. This creates a more efficient communication process between the server 110 and the client 112.

In yet another alternative or additional embodiment, certain embodiments of the computing device 100 may include a hardware based solution where the server 110 and the client 112 may be implemented as hardware devices such that the client 112 and the server 110 can implement Direct Memory Access (DMA) functionality. In particular, DMA allows certain hardware subsystems of a computer system to access system memory independent of the CPU 116. Similar to inter-process communication, DMA can be used to share file data between the server 110 and client 112 without needing to copy the data between the two components. Rather, the file data is simply shared in the shared memory 114 and accessed using DMA functionality.

Figure 2:
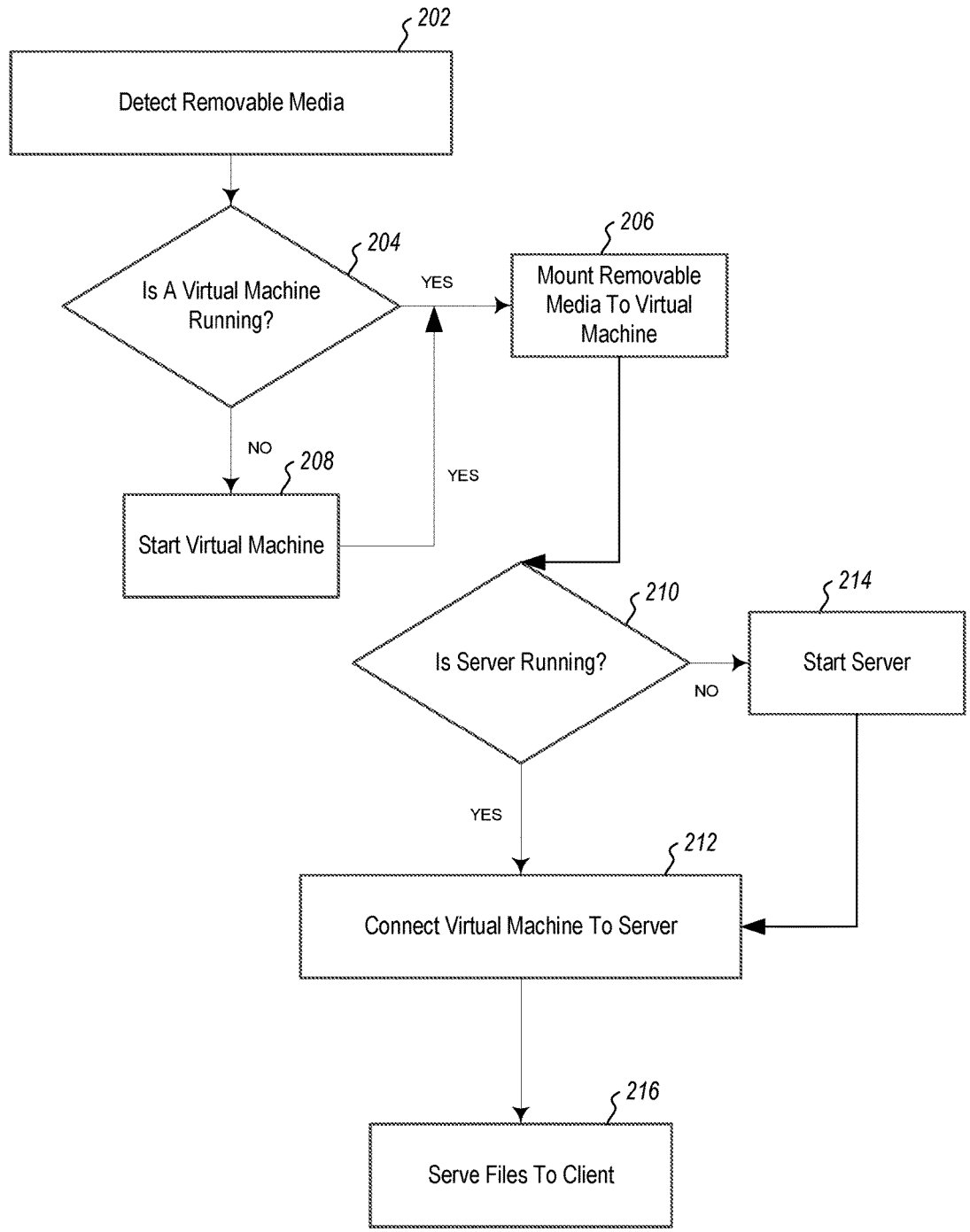
FIG. 2 illustrates a flow for mounting a filesystem and providing file data.

Referring now to FIG. 2, a flow 200 is illustrated. The flow 200 illustrates various actions that may be performed in implementing some embodiments of the invention.

At 202, removable media is detected. For example, embodiments may detect that removable media 106 is connected to the port 104. For example, the port 104 may have interrupts associated with it that trigger when removable media 106 is connected to the port 104. These interrupts can interrupt hardware and/or software, such as the CPU 116 for the computing device 100 and/or the operating system for the computing device 100. This can cause the hardware and/or software to indicate to the hypervisor 108 that the removable media's filesystem 120 should be mounted to a virtual machine.

At 204, a determination is made as to whether or not the virtual machine 102 is running. For example, this determination may be made by the hypervisor 108, which controls the virtual machine 102.

As illustrated at 206, if the virtual machine 102 is running, then the removable media's filesystem will be mounted to the virtual machine 102.

However, as illustrated at 208, if the virtual machine 102 is not running, then the virtual machine 102 will be started, and then the removable media's filesystem 120 will be mounted to the virtual machine 102 as illustrated at 206.

Note that in some embodiments, the virtual machine 102 may be configured to continuously run in anticipation of the removable media 106 being connected to the computing device 100. However, in other embodiments, the virtual machine may be configured to only run when removable media 106 is connected to the computing device 100.

As illustrated at 210, a determination is made as to whether or not the server 110 is running. If the server 110 is running, then as illustrated at 212, the virtual machine 102 is connected to the server 110 to make files in the filesystem 120 available to the server 110. If the server 110 is not running, then as illustrated at 214, the server 110 is started and the virtual machine 102 is connected to the server 110 as illustrated at 212.

As illustrated at 216, the server 110 then serves files to the client 112 on the computing device 100. As noted previously, this may be done, for example, by sending actual file data to the client 112, or by storing the file data in shared memory 114 and providing pointers to the file data to the client.

In one embodiment, the filesystem 120 could be mounted to the virtual machine 102 to determine if the filesystem 120 crashes the virtual machine 102 or attempts to scrape files from the virtual machine 102. If the filesystem 120 does not crash the virtual machine 102, then the filesystem of the removable media 106 could be un-mounted from the virtual machine 102 and mounted directly to the computing device 100 such that the computing device could access file data on the removable media 106 without needing to access the data through the client 112, server 110, and virtual machine 102.

Figure 3:
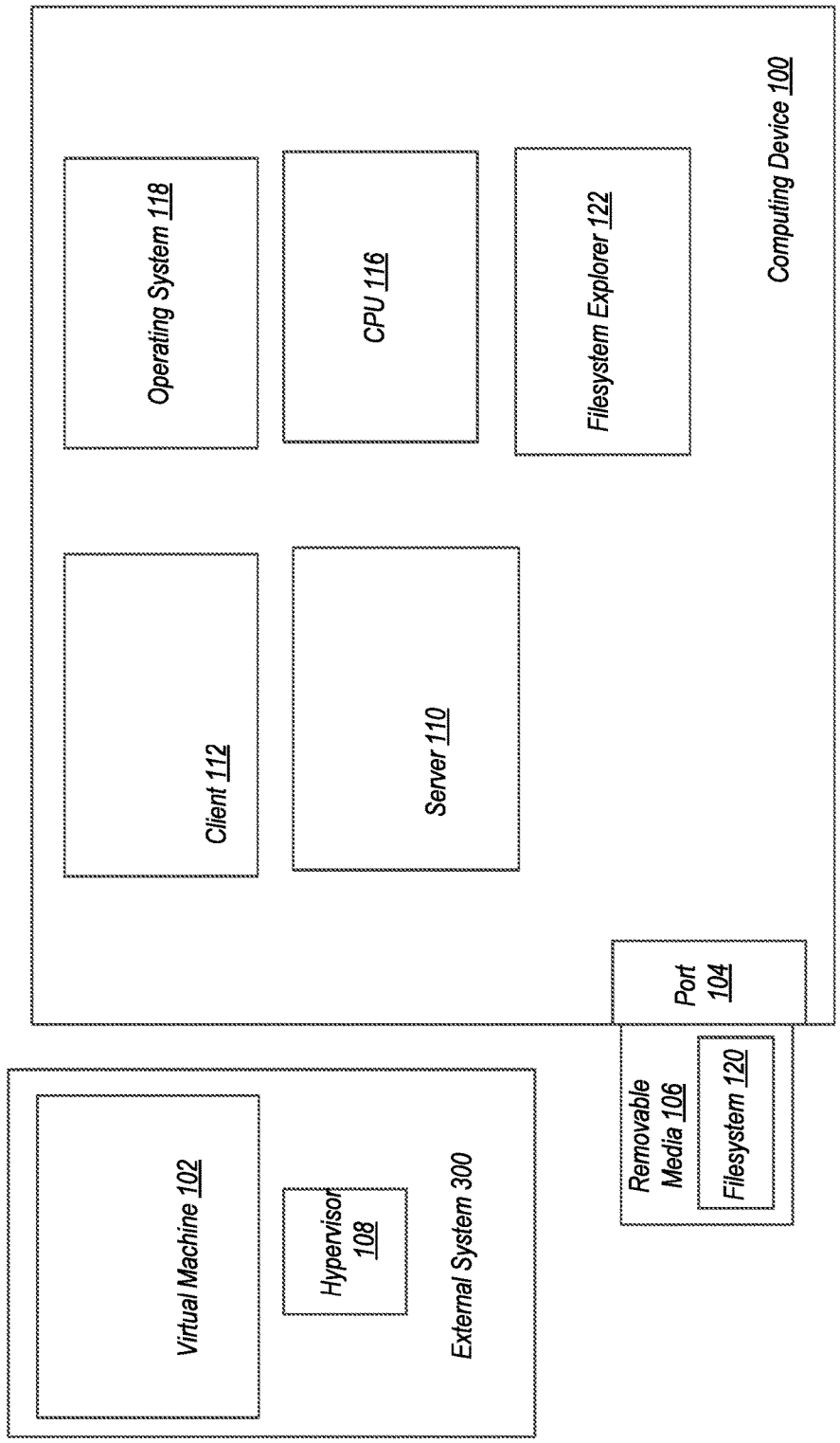
FIG. 3 illustrates an alternate system configured to mount a filesystem on removable media to a virtual machine.

Note that in some such embodiments, as illustrated in FIG. 3, the virtual machine 102 could actually be implemented on an external system 300 external to the computing device 100. In this example, the removable media 106 would still be coupled to the port 104 of the computing device 100, however, the filesystem 120 of the removable media would be mounted to a virtual machine external to the computing device using networking functionality between the computing device 100 and the external system 300. If the filesystem 120 did not crash the virtual machine external to the computing device 100, then the virtual machine could indicate this to the computing device 100, which would then mount the filesystem 120 directly to the computing device 100 for use by applications and hardware at the computing device 100. Directly mounting the filesystem 120 to the computing device 100 may include, for example, allowing the operating system 118 and/or other kernel components of the computing device 100 to access and manage the filesystem 120.

Note that some embodiments that are able to detect when the filesystem 120 crashes the virtual machine 102 or a virtual machine external to the computing device 100 may also include functionality for reporting that the filesystem 120 crashed the virtual machine 102. In particular, this reporting mechanism may be configured to report the crash to various operating system manufacturers and providers. This can help the operating system manufacturers and providers to address the crash so as to prevent the filesystem 120 from crashing other computing devices that do not have the protections illustrated for the computing device 100 illustrated herein. In some embodiments the hypervisor 108, or a hypervisor on a system external to the computing device 100 may be configured to report the crash of the virtual machine to the operating system manufactures and providers. Alternatively, or additionally, a specialized reporting service may be implemented to report the crash of the virtual machine.

Some embodiments may be configured to affect any changes on file data on the removable media 106 by causing the hypervisor 108 to make the changes. In particular, should an application on the computing device 100 need to change file data on the removal media 106, the application could so indicate to the hypervisor 108. The hypervisor 108 could then make these changes using the filesystem 120 mounted to the virtual machine 102. This could be used to implement built in air-gapping between the computing device 100 and the filesystem 120.

Embodiments may be configured to mount the removable media 106 filesystem 120 to the virtual machine 102 in a way that is seamless for users of the computing device 100. In particular, it may be desirable such that a user of the computing device 100 is not aware that the filesystem 120 is mounted to a virtual machine 102. Rather it may be beneficial to the user if it appears to the user that the files are directly available on the computing device 100 even though file data on the removable media 106 are being provided by the virtual machine 102, through the server 110 and through the client 112, in some embodiments, the client 112 may be configured to integrate with a filesystem explorer 122 of the computing device 100. In particular, the client 112 can interface with a user interface of the filesystem explorer 122 to show file data from the filesystem 120 in the user interface of the filesystem explorer 122. For example, the filesystem explorer 122 may be configured with a user interface that allows a user to view file data in the filesystems mounted to the computing device 100. The user interface may be further configured to be connected to the client 112 for displaying file data from the filesystem 120 of the removable media 106 even though that filesystem 120 is not mounted directly to the computing device 120. In some embodiments, the filesystem 120 may be represented as a drive in the user interface of the filesystem explorer 122.

In some embodiments, the filesystem 120 may simply appear as a next available drive in the filesystem explorer 122. Alternatively, or additionally, the filesystem explorer 122 may identify the drive for the filesystem 120 of the removable media 106 as one that is coupled indirectly to the computing device 100. This can be used to allow technical users to make engineering choices with respect to the use of the file data from the filesystem 100 of the removable media 106.

Embodiments may be configured to turn various features of the invention on and off. For example, some embodiments may include a user selectable feature that allows the user to decide if removable media 106 will have its file system 120 mounted to the virtual machine 102 or directly to the computing device 100 without going through the virtual machine 102.

Some of the embodiments illustrated herein implementing the features described can be used to create a more secure computing device 100 which is able to be protected from a file system on removable media from being able to harm the computing device 100. Additionally, embodiments may be configured to create a more secure computing device 100 by preventing the file system of removable media from scraping information from the computing device 100.

The following discussion now refers to a number of methods and method acts that be performed. Although the method acts may be discussed in a certain order or illustrated in a flow chart as occurring in a particular order, no particular ordering is required unless specifically stated, or required because an act is dependent on another act being completed prior to the act being performed.

Figure 4:
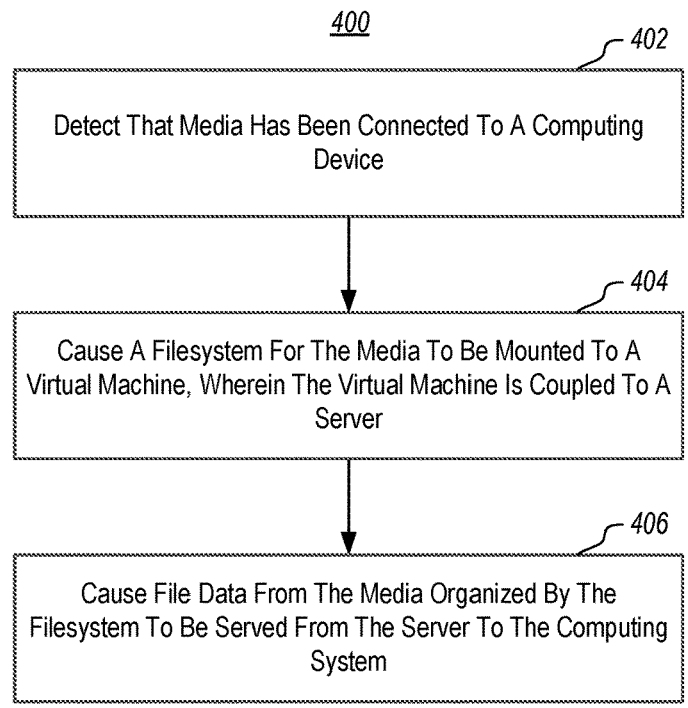
FIG. 4 illustrates a method of mounting a filesystem.

Referring now to FIG. 4, a method 400 is illustrated.

The method 400 includes detecting that media has been connected to a computing device (act 402). For example, as illustrated in FIG. 1, the operating system 118 may detect that the removable media 106 is coupled to a port 104 of the computing device 100.

The method 400 further includes causing a filesystem for the media to be mounted to a virtual machine, wherein the virtual machine is coupled to a server (act 404). For example, the file system 120 is mounted to the virtual machine 102. The virtual machine 102 is coupled to the server 110.

The method 400 further includes causing file data from the media organized by the filesystem to be served from the server to the computing device (act 406). For example, files are served from the server 110 and the virtual machine 102 on the computer system 100 back to a client 112 on the computer system 100 itself.

The method 400 may further include determining that the filesystem does not crash the virtual machine, and as a result, mounting the filesystem directly to the computing device. For example, this is a way of ensuring that the removable media, will not crash a system when installed. If the removable media will not crash the system, then it can be allowed to be connected directly to the computing device 100 itself. In particular, in the example illustrated, the filesystem 120 can be mounted directly to the system 100 by having the operating system 118 at the computing device 100 manage the filesystem 120 rather than serving files from the server 110.

The method 400 may be practiced where the virtual machine and the server are implemented on the computing device. Thus, as illustrated in FIG. 1, the virtual machine 102 and the server 110 may be implemented on the same computing device 100.

In some embodiments, file data is served from the server to a client at the computing device using shared memory. Thus, as illustrated in FIG. 1, shared memory 114 may be used to serve file data in the filesystem 120 from the server 110 to the client 112.

In some embodiments, file data is served from the server to a client at the computing device using inter-process communication between the server and the client on the computing system.

In some embodiments, the server and client are implemented in hardware, and file data is served from the server to a client at the computing device using Direct Memory Access (DMA) communication between the server and the client on the computing system.

The method 400 may be practiced where the media is at least one of a USB memory stick or a removable memory card. Note that the removable media may include other media, additionally or alternatively, such as external hard drives connected by USB or Lightning connectors. Indeed the removable media may be items such as tape drives or other storage devices.

The method 400 may be practiced where the virtual machine and the server are implemented external to the computing device. For example, as illustrated in FIG. 3, the server 110 is implemented external to the computing device 100. The client 112 will then communicate with the server 110 using network communications or other appropriate communication means.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing device, comprising:
   a processor; and
   a memory having stored thereon instructions executable by the processor to cause the computing device to provide an operating system, a fileserver, a client to the fileserver, and a virtual machine hosted on the computing device, the memory also having additional instructions executable by the processor to cause the computing device to:
      detect that a removable data storage device is connected to the computing device, the removable data storage device having a filesystem organizing file data on the detected removable data storage device; and
      upon detecting the removable data storage device being connected to the computing device,
         mount the filesystem of the removable data storage device to the virtual machine hosted on the computing device without directly mounting the filesystem of the removable data storage device to the operating system of the computing device; and
         serve, via the fileserver, the file data organized by the filesystem from the removable data storage device mounted to the virtual machine to the client on the computing device, thereby preventing the filesystem on the removable data storage device from affecting other parts of the computing device by limiting the filesystem of the removable data storage device to have access to only resources available to the virtual machine on the computing device.

2. The computing device of claim 1 wherein the memory further has stored thereon instructions that are executable by the processor to cause the computing device to determine whether the filesystem of the removable data storage mounted to the virtual machine crashes the virtual machine, and in response to determining that the filesystem mounted to the virtual machine does not crash the virtual machine, mount the filesystem directly to the computing device.

3. The computing device of claim 1; wherein the file data is served from the fileserver to the client at the computing device using shared memory.

4. The system computing device of claim 3 wherein the file data is served from the fileserver to the client at the computing device using inter-process communication between the fileserver and the client on the computing system.

5. The computing device of claim 3 wherein the fileserver and client are implemented in hardware, and wherein the file data is served from the fileserver to the client at the computing device using Direct Memory Access (DMA) communication between the fileserver and the client on the computing system.

6. The computing device of claim 1 wherein the removable data storage device a Universal Serial Bus (USB) memory stick or a removable memory card.

7. A computer implemented method of mounting a removable data storage device to a computing device, the method comprising:
   detecting, at the computing device, that the removable data storage device is physically connected to the computing device, the removable data storage device having a filesystem organizing file data on the detected removable data storage device; and
   upon detecting that the removable data storage device is connected to the computing device,
      mounting the filesystem of the removable data storage device to a virtual machine without directly mounting the filesystem of the removable data storage device to an operating system of the computing device; and
      serving, via a fileserver, the file data organized by the filesystem from the removable data storage device mounted to the virtual machine to one or more clients of the fileserver, thereby preventing the filesystem on the removable data storage device from affecting other parts of the computing device by limiting access of the filesystem of the removable data storage device to only resources allocated to the virtual machine on the computing device.

8. The method of claim 7, further comprising:
   upon detecting that the removable data storage device is connected to the computing device,
      instantiating the virtual machine on the computing device; and
      mounting the filesystem of the removable data storage device to the instantiated virtual machine on the computing device without directly mounting the filesystem of the removable data storage device to the operating system of the computing device.

9. The method of claim 7, further comprising:
upon detecting that the removable data storage device is connected to the computing device,
instantiating the virtual machine on another computing device external to the computing device; and
mounting the filesystem of the removable data storage device to the instantiated virtual machine on the another computing device without directly mounting the filesystem of the removable data storage device to the operating system of the computing device.

10. The method of claim 7, further comprising:
upon detecting that the removable data storage device is connected to the computing device,
instantiating the virtual machine on the computing device, the virtual machine being configured to prevent application launching;
mounting the filesystem of the removable data storage device to the instantiated virtual machine on the computing device without directly mounting the filesystem of the removable data storage device to an operating system of the computing device; and
preventing any applications from being launched in the virtual machine from the removable data storage device.

11. The method of claim 7 wherein:
detecting that the removable data storage device is physically connected to the computing device includes receiving an interrupt signal from a port on the computing device that the removable data storage device is physically connected to the port; and
the method further includes, in response to receiving the interrupt signal,
instructing a hypervisor on the computing device to instantiate the virtual machine on the computing device; and
upon instantiating the virtual machine, mounting the filesystem of the removable data storage device to the instantiated virtual machine on the computing device without directly mounting the filesystem of the removable data storage device to the operating system of the computing device.

12. The method of claim 7, further comprising:
detecting that the removable data storage device is physically connected to the computing device includes receiving an interrupt signal from a port on the computing device that the removable data storage device is physically connected to the port; and
the method further includes, in response to receiving the interrupt signal,
instructing a hypervisor on the computing device to instantiate the virtual machine on the computing device;
upon instantiating the virtual machine, mounting the filesystem of the removable data storage device to the instantiated virtual machine on the computing device without directly mounting the filesystem of the removable data storage device to the operating system of the computing device; and
upon receiving a request to modify the file data on the removable data storage device, instructing the hypervisor to make the requested change to the file data.

13. The method of claim 7, further comprising:
subsequent to mounting the filesystem of the removable data storage device to the virtual machine,
determining whether the mounted filesystem of the removable data storage device crashes the virtual machine; and in response to determining that the mounted filesystem of the removable data storage device does not crash the virtual machine,
un-mounting the filesystem of the removable data storage device from the virtual machine; and
mounting the filesystem of the removable data storage device directly to the operating system of the computing device, thereby allowing the computing device to access the file data on the removable data storage device without accessing the file data via the fileserver.

14. The method of claim 7 wherein serving the file data to the one or more clients of the fileserver includes serving, via the fileserver, the file data organized by the filesystem from the removable data storage device mounted to the virtual machine to the one or more clients of the fileserver using one or more of:
shared memory;
inter-process communication between the fileserver and the client on the computing system; or
Direct Memory Access (DMA) communication between the fileserver and the client on the computing system.

15. A computing device, comprising:
a processor and a memory containing instructions executable by the processor to cause the computing device to:
upon detecting, at the computing device, that a removable data storage device is physically connected to the computing device, the removable data storage device,
mount a filesystem of the removable data storage device to a virtual machine without directly mounting the filesystem of the removable data storage device to an operating system of the computing device, the filesystem organizing file data on the removable data storage device; and
serve, via a fileserver, the file data organized by the filesystem from the removable data storage device mounted to the virtual machine to one or more clients of the fileserver, thereby preventing the filesystem on the removable data storage device from affecting other parts of the computing device by limiting access of the filesystem of the removable data storage device to only resources allocated to the virtual machine on the computing device.

16. The computing device of claim 15 wherein the memory contains additional instructions executable by the processor to cause the computing device to:
upon detecting that the removable data storage device is connected to the computing device,
instantiate the virtual machine on the computing device; and
mount the filesystem of the removable data storage device to the instantiated virtual machine on the computing device without directly mounting the filesystem of the removable data storage device to the operating system of the computing device.

17. The computing device of claim 15 wherein the memory contains additional instructions executable by the processor to cause the computing device to:
upon detecting that the removable data storage device is connected to the computing device,
instantiate the virtual machine on the computing device, the virtual machine being configured to prevent application launching;
mount the filesystem of the removable data storage device to the instantiated virtual machine on the computing device without directly mounting the filesystem of the removable data storage device to an operating system of the computing device; and prevent any applications from being launched in the virtual machine from the removable data storage device.

18. The computing device of claim 15 wherein the memory contains additional instructions executable by the processor to cause the computing device to:

subsequent to mounting the filesystem of the removable data storage device to the virtual machine, determine whether the mounted filesystem of the removable data storage device crashes the virtual machine; and in response to determining that the mounted filesystem of the removable data storage device does not crash the virtual machine, un-mount the filesystem of the removable data storage device from the virtual machine; and mount the filesystem of the removable data storage device directly to the operating system of the computing device, thereby allowing the computing device to access the file data on the removable data storage device without accessing the file data via the fileserver.

19. The computing device of claim 15 wherein to serve the file data to the one or more clients of the fileserver includes to serve, via the fileserver, the file data organized by the filesystem from the removable data storage device mounted to the virtual machine to the one or more clients of the fileserver using one or more of:

shared memory;

inter-process communication between the fileserver and the client on the computing system; or Direct Memory Access (DMA) communication between the fileserver and the client on the computing system.

20. The computing device of claim 15 wherein the removable data storage device is a Universal Serial Bus (USB) memory stick or a removable memory card.

* * * * *